United States Patent
Wiley et al.

(10) Patent No.: US 11,872,553 B2
(45) Date of Patent: Jan. 16, 2024

(54) PROCESSING SYSTEM AND METHOD

(71) Applicant: Wiley Organics, Inc., Coshocton, OH (US)

(72) Inventors: David B. Wiley, Coshocton, OH (US); Paul V. Wiley, Coshocton, OH (US); Matthew J. Farber, Galena, OH (US)

(73) Assignee: Wiley Organics, Inc., Coshocton, OH (US)

( * ) Notice: Subject to any disclaimer, the term of this patent is extended or adjusted under 35 U.S.C. 154(b) by 0 days.

(21) Appl. No.: 17/816,590

(22) Filed: Aug. 1, 2022

(65) Prior Publication Data
US 2022/0362761 A1    Nov. 17, 2022

Related U.S. Application Data

(63) Continuation of application No. 16/717,828, filed on Dec. 17, 2019, now Pat. No. 11,406,974.

(51) Int. Cl.
*B01L 3/00*    (2006.01)

(52) U.S. Cl.
CPC ......... *B01L 3/502* (2013.01); *B01L 2300/185* (2013.01); *B01L 2400/0475* (2013.01); *B01L 2400/086* (2013.01)

(58) Field of Classification Search
CPC .............. B01L 3/502; B01L 2300/185; B01L 2400/0475; B01L 2400/086
See application file for complete search history.

(56) References Cited

U.S. PATENT DOCUMENTS

| | | | |
|---|---|---|---|
| 3,090,732 A | 5/1963 | Dieter et al. |
| 3,225,817 A | 12/1965 | Bernd |
| 3,250,311 A | 5/1966 | Bernd |
| 3,252,502 A | 5/1966 | Eckardt et al. |
| 3,334,680 A | 8/1967 | McManus |
| 3,357,477 A | 12/1967 | Monty |

(Continued)

FOREIGN PATENT DOCUMENTS

| | | |
|---|---|---|
| CN | 103263780 A | 8/2013 |
| CN | 105833560 A | 8/2016 |

(Continued)

OTHER PUBLICATIONS

International Search Report and Written Opinion for PCT Application No. PCT/US2020/064906, dated Mar. 5, 2021, 15 pgs.

*Primary Examiner* — Jennifer Wecker
*Assistant Examiner* — Kathryn Elizabeth Limbaugh
(74) *Attorney, Agent, or Firm* — Fletcher Yoder P.C.

(57) ABSTRACT

In accordance with one embodiment, a processing device includes a heated internal wall and a rotating rod positioned within an interior space formed by the heated internal wall. The rotating rod may be hollow and act as an internal heat exchanger. The processing device also includes a plurality of baffles spaced apart from one another along the rotating rod and extending away from the rotating rod towards the heated internal wall. The processing device also includes at least one wiper or roller coupled to an edge of at least one of the plurality of baffles or porous, packed basket, coupled to the rotating rod and that contacts the heated internal wall while rotating together with the rotating rod. In another embodiment, a processing device may be used to adsorb reactive gases into a liquid phase while heat is exchanged.

19 Claims, 7 Drawing Sheets

(56) References Cited

U.S. PATENT DOCUMENTS

| | | | |
|---|---|---|---|
| 3,428,106 A | * | 2/1969 | Johnston ............ B01D 1/226 |
| | | | 202/236 |
| 3,477,491 A | | 11/1969 | Henry et al. |
| 3,797,550 A | | 3/1974 | Latinen |
| 3,880,668 A | | 4/1975 | Miller |
| 4,093,479 A | | 6/1978 | Baird |
| 4,198,361 A | | 4/1980 | Shafranovsky et al. |
| 4,654,124 A | | 3/1987 | Elias et al. |
| 5,472,574 A | | 12/1995 | Roark, Sr. |
| 7,414,159 B2 | | 8/2008 | Stroefer et al. |
| 2011/0100561 A1 | | 5/2011 | Alasti et al. |
| 2015/0190729 A1 | | 7/2015 | Christensen et al. |
| 2017/0080354 A1 | | 3/2017 | Steeves et al. |
| 2018/0117493 A1 | | 5/2018 | Mukaida et al. |

FOREIGN PATENT DOCUMENTS

| | | |
|---|---|---|
| CN | 206414778 U | 8/2017 |
| DE | 1161852 B | 1/1964 |
| DE | 2843132 A1 | 6/1980 |
| DE | 10024420 A1 | 11/2001 |
| FR | 1516647 A | 3/1968 |
| WO | 2011053942 A1 | 5/2011 |

* cited by examiner

PROCESSING SYSTEM AND METHOD

CROSS-REFERENCE TO RELATED APPLICATION

The present application is a continuation of and claims priority to U.S. patent application Ser. No. 16/717,828, entitled "PROCESSING SYSTEM AND METHOD," filed Aug. 9, 2022, the disclosure of which is incorporated herein by reference for all purposes.

FIELD OF DISCLOSURE

The present disclosure relates generally to the field of chemical processing techniques. More specifically, embodiments of the present disclosure relate to methods and systems of chemical processing techniques involving thermally labile or unstable materials.

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Chemical processing often involves an interaction between liquids and gases. In some cases, reactive gases may dissolve in reactive liquids, thus facilitating a desired reaction. A reacting liquid, gas, and/or the resultant chemical compounds produced during processing, may be unstable or produce poor yields unless an optimum temperature or temperature range is maintained. Temperature control may be a matter of efficiency to obtain high yields of products. Further, limiting retention time in a reaction zone may improve the chemical yield and selectivity in the synthesis of certain products.

In other cases, liquids and gases may exist in equilibration at the boiling/condensation point of the liquids or gases. In such a case, it is desirable that the liquids and gases do not react to form unwanted chemical compounds, either with other compounds in the mixture or by intramolecular thermal degradation. Rather, it is often desired that the gases and liquids interact to some degree to establish an equilibrium mixture between the elements or compounds found in gas phase and those within a liquid phase that are in contact with one another. The chemical composition of gas and liquid phases in equilibrium with one another are affected by differences in the volatility of different compounds within a mixture. It is possible to separate gases with different certain chemical compositions from liquids with other compositions that have been in contact with one another at their boiling point. Thus, with phase separation and subsequent condensation of the gas mixture, separate liquid mixtures will reflect the relative differences in volatility and condensation rates of the components contained in the mixtures.

Selective application of heat to the mixture permits collection of gas that includes a component fraction of interest having relatively higher volatility and with reduced concentrations of other compounds in the mixture that have higher boiling points. Fractional distillation is a type of distillation that uses a fractional distillation column to progressively alter gas and liquid compositions. Such a column may have a series of platforms or trays (actual or theoretical) upon which vapor ascending the column may condense and subsequently re-vaporize with liquid descending along a temperature gradient in the column. Progressive cycles of condensing and forming vapor increases the concentration of a more highly volatile component of interest in the gas that concentrates at the top of the column. In the alternative, a fractional distillation column may use internal packing rather than trays to provide surface area upon which vapor interacts with the liquid phase in the column to progressively condense and subsequently vaporize.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with one embodiment, a processing device includes an internal wall that forms an interior space and a rotating rod positioned within the interior space. The processing device also includes a plurality of baffles spaced apart from one another along the rotating rod and extending away from the rotating rod towards the internal wall, wherein the plurality of baffles are configured to rotate with the rotating rod relative to the internal wall. The processing device also includes at least one wiper or roller coupled to an edge of at least one of the plurality of baffles or coupled to the rotating rod, wherein the at least one wiper or roller contacts the internal wall, and wherein the at least one wiper or roller is configured to rotate with the rotating rod.

In another embodiment, a method includes the steps of providing a liquid having an initial percentage composition of a component to an interior space of a processing device, controlling a jacket temperature of the processing device to form vapor from the liquid in the interior space, wherein the vapor comprises the component of the liquid, and rotating a rotating assembly within the processing device and relative to the jacket to move the vapor and liquid within the interior space. Rotating the rod causes a plurality of rollers coupled to the rod to contact a film of the liquid on an interior wall of the jacket such that rotation of the rollers against the interior wall causes droplets of the liquid to move towards a center of the interior space. The method further includes condensing the vapor collected from the processing device to form a condensate to remove the component from the processing device, wherein the condensate has a second percentage composition of the component that is higher than the initial percentage composition of the component in the liquid.

In another embodiment, a processing device includes a heated or cooled jacket forming an interior space, the interior space being within an internal wall of the heated or cooled jacket. The processing device also includes a rod positioned within the interior space and configured to rotate about a first axis of rotation. The processing device also includes a plurality of baffles spaced apart from one another along the rod and extending away from the rod towards the internal wall, wherein the plurality of baffles are configured to rotate with the rod and relative to the internal wall and a plurality of roller assemblies coupled to the rod. An individual roller assembly of the plurality of roller assemblies includes a bracket coupled to the rod or at least one baffle of the plurality of baffles and a roller coupled to the bracket, wherein the roller is in contact with the internal wall and configured to rotate against the internal wall during rotation of the rod about a second axis of rotation parallel to the first axis of rotation.

In another embodiment, a processing device includes an internal wall; a rotating hollow rod positioned within an interior space formed by the internal wall; a basket disposed about the rotating hollow rod, heat transfer fluid supplied to the internal portion of the hollow rod, with the attached rotating basket comprising a perforated surface and filled with a porous packing; and a motor configured to rotate the rotating rod and the basket assembly relative to an interior surface of the processing device.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
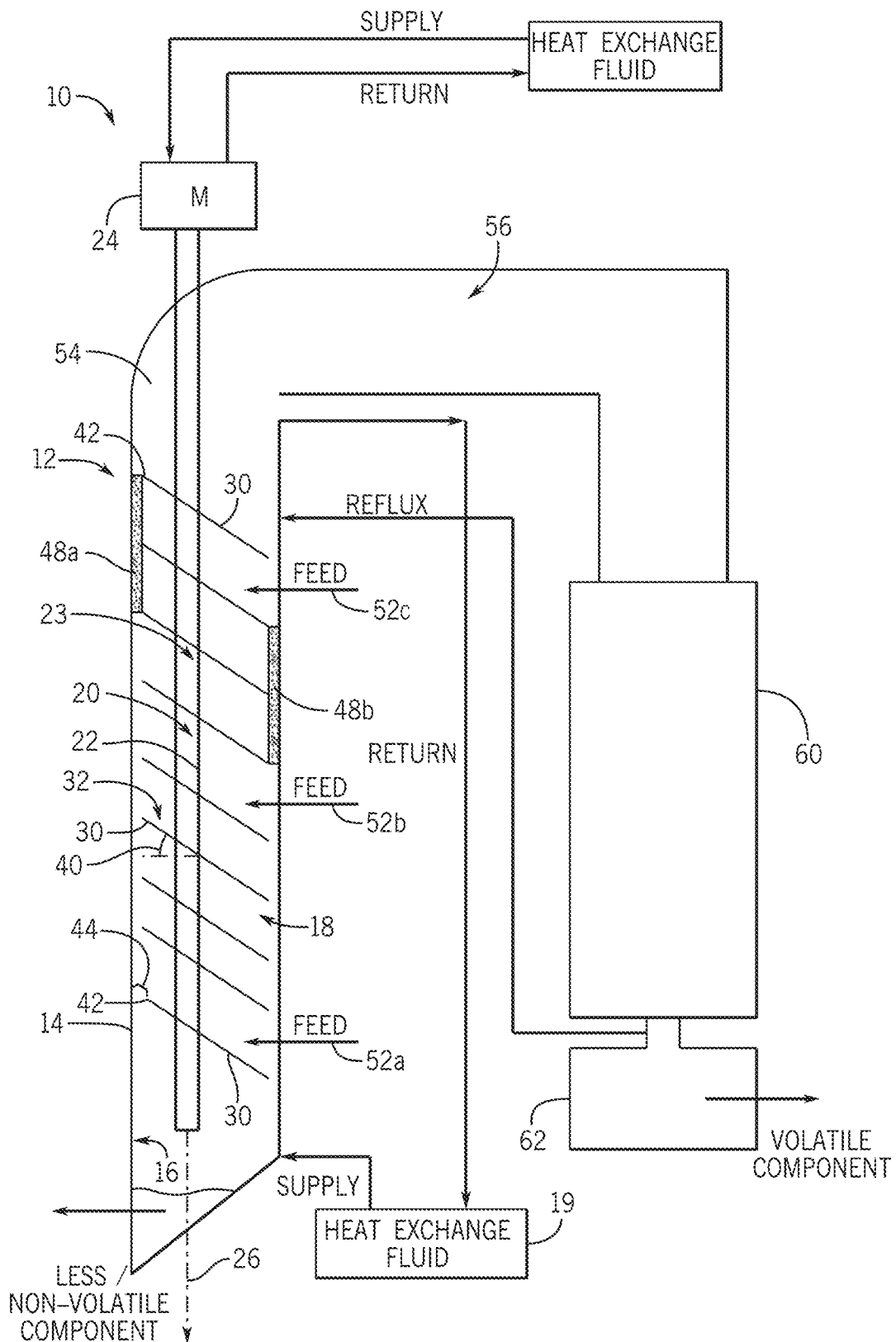
FIG. 1 is a block diagram of a system that includes a processing device in accordance with the present techniques.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The disclosed techniques may be used as part of a chemical processing technique, such as a separation process for separating components of a fluid or for at least partial purification or removal of one or more compounds of interest from a fluid (e.g., a liquid or liquid mixture). In one embodiment, the disclosed techniques may be used to separate one or more compounds that have a short half-life or that are thermally labile at temperatures/pressures close to their boiling points. In one embodiment, the disclosed techniques may be used in food processing or pharmaceutical synthesis techniques to reduce decomposition of desired products. In one embodiment, the present disclosure provides an improved processing device for processes involving heat-sensitive chemicals (thermally unstable and/or viscous), such as fatty acid esters, polyhydric alcohols, unsaturated oils, food additives, pheromones, reactive monomers, fragrances and flavors, small molecule compounds, sugars, sugar esters, carotenoids, etc., by employing a novel heat exchange device capable of enhanced separation of liquid-gas mixtures at elevated temperature and, in certain embodiments, under a reduced pressure/vacuum. In certain embodiments, the heat-sensitive chemicals may result from reactions with one or more of gases like ozone, $F_2$, ketene, $Cl_2$, $SO_3$, $H_2$, etc., introduced near the bottom outlet of the processing device while a liquid feed introduced at a higher level feed zone. The disclosed implementations are by way of example, and it should be understood that the present techniques may be applied to the reaction between gasses and liquids or the separation of mixtures including compounds with relative differences in volatility. The present techniques permit reaction or separation with reduced decomposition of heat-sensitive compounds under the temperatures used during processing. The present techniques also provide a specialized heat exchanger for a two phase system.

In one implementation, the processing device is a distillation device or a fractional distillation device. Distillation is a separation process that relies on differences in volatility to split a stream of two or more different molecules into partial component fractions. The degree of separation is often described by how many "theoretical plates" a column achieves. A theoretical plate is a theoretical zone or stage where liquid and vapor phases of a mixture establish equilibrium. The vapor-liquid equilibrium is a physical property of a mixture that determines the composition of the liquid and vapor phases at a fixed pressure and temperature. As vapor rises up the column and interacts with the liquid flowing down the column, including a liquid film that forms or is introduced onto the column walls, and/or with pooled liquid on surfaces inside the column, vapor-liquid equilibrium is established multiple times. The vapor is enriched with the lower boiling components, while the liquid is enriched with the higher boiling components. Vapor-liquid equilibrium is traditionally achieved by using either trays or packing in a distillation column. A tray forces the rising vapor through a pool of liquid, thus establishing equilibrium at each tray. Unlike trays, a packed column establishes equilibrium through a more continuous method. The liquid flowing down the column covers the packing in a thin film, allowing vapor to continuously interact with the liquid. A packed column relies on exposed surface area for efficient vapor-liquid contact.

The disclosed embodiments provide a processing device that facilitates repeated vapor-liquid interactions within the rotating assembly while reducing or minimizing temperature exposure for the components involved in the process. The reduction in temperature exposure and retention time in the heated zone relative to other distillation techniques results in decreased degradation of such heat-sensitive compounds while maintaining the separation benefits of thin film generation, which in turn permits fractional distillation to be used as a separation technique in a wider range of processes and/or with a wider range of mixtures. The processing device disclosed herein is suitable for the rectification of heat-sensitive compounds, which are complex to separate and may typically be purified using costly multi-step processes. In one embodiment, the processing device permits heat control or heat exchange by one or multiple heating zones or jackets to provide more progressive temperature control within the device (e.g., individually addressable temperature control in each zone), thus reducing exposure to degrading temperature levels. An external condenser above the heated zones is used to condense gas collected from the device and provides reflux return. The processing device may also be arranged with variable and/or multiple potential feed positions along a length of the device to provide variable temperature and vapor flow paths according to a desired workflow.

In one embodiment, the processing device includes an internal rotating assembly that rotates baffles (e.g., helical baffles) to promote vapor movement within the device. The internal baffles extend the vapor path and enhance turbulence. The baffles may be operated with a rotation direction that is co-current or countercurrent to the vapor flow path. To accommodate the vapor flow rate and increase turbulence, the baffles may be constructed with a variable flight spacing and/or pitch as provided herein. The baffles may be solid, perforated, or constructed from screens. Further, the baffles may be constructed such that edges of the baffles do not directly contact (e.g., with fixed clearance) the internal device wall during rotation or that intermittently contact the internal device wall. The baffles of the rotating assembly may be fixed clearance relative to the internal device walls. In certain embodiments, the rotating assembly includes one or more liquid film disrupters that are configured to directly contact the internal device walls to disrupt the liquid film, e.g. spray or move liquid drops into the interior space of the device and away from the walls, which in turn enhances liquid-vapor interactions. The liquid film disrupters may include one or more scraped-surface wipers and/or rollers, which may be advantageous for less viscous liquids as well as for materials with very high fouling tendencies or vaporization ratios. In general, the more interaction between the vapor and liquid phases result in an increased vapor liquid equilibrium over the entire rotating assembly. Accordingly, the present techniques provide a processing device with one or more of the following features: (i) rotating helical baffle, (ii) condensate return, (iii) adjustable feed positioning on the device, (iv) internal condenser, and (v) turbulent mixing of the liquid film layer to create improved contact between the vapors and the condensate in the reboiler. The vertical configuration provides reliable, efficient processing of viscous and/or fouling fluids.

FIG. 1 is a schematic diagram of a system 10 that includes a processing device 12 in accordance with embodiments of the disclosure. It should be understood that the system 10 may be a component of a larger or more complex separation process and may be interconnected to additional components (e.g., one or more feed sources, heating elements, collection reservoirs, fluid couplings, control systems including processor-based controllers that respond to control inputs and outputs via an operator interface, vents, valves) depending on the desired workflow. That is, the processing device 12 may include one or more inlets to receive a stream of a material for processing (e.g., distillation) and may include one or more outlets or couplings to permit separated or processed materials (e.g., separated volatile and non-volatile components) to exit the processor device 12. The processing device 12 is depicted as a column, but may be implemented having other appropriate dimensions (e.g. the diameter may be greater than the height). An internal wall 14 with an internal wall surface 16 of the processing device 12 bounds an interior space 18. As discussed herein, the internal wall 14 may be configured to control temperature via a heat exchange fluid from a heat exchange fluid or vapor source 19 and may, in certain embodiments, be part of one or more temperature control jackets. The heat exchange fluid may provide temperature control, e.g., heating or cooling, depending on the temperature of the heat exchange fluid. In one embodiment, the processing device 12 does not include heat sources such as a bottom boiler positioned to drive heat and vapor up the device, which may provide more uneven heat exposure to and in turn may damage the processed components of interest.

The processing device 12 includes a rotating assembly 20 with a rod 22 coupled to a motor 24 that drives rotation of the rod 22 within the processing device 12 and about an axis of rotation 26. The motor 24 may be internal or external to the processing device 12. Rotation of the rotating assembly 20 may occur while other structures, such as the internal wall 14, of the processing device 12 are substantially fixed or do not rotate. The rotating assembly may be coupled to other features of the device 12 and/or system 10 via a rotary union. As provided herein, in certain embodiments, the rod 22 may include an interior passage or bore fluidically coupled to the heat exchange fluid source 19 and configured to receive the heat exchange fluid such that the rod 22, additionally or alternatively the internal wall 14, act as a heat exchanger. Accordingly, the processing device 12 may include one or more heat exchange surfaces to control a temperature within the device 12. The heat exchange surfaces may include the internal wall surface 16, which is a stationary surface, and a rod surface 23, which in operation is a rotating surface. One or both of the heat exchange surfaces and associated fluidic couplings may be included in the implementation of the device 12. Further, when present, one or both of the heat exchange surfaces may be active in providing heat exchange, depending on the desired specifications of temperature control. In one example, the available heat exchange surface of the internal wall surface 16 (the surface area facing the interior space 18) is greater than the available heat exchange surface of the rod surface 23 (the rod surface area facing the interior space 18 of the device 12). The ratio of the wall surface area to the rod surface area may be approximately 1:20 to 0.9:1.

The rotating assembly 20 also includes a plurality of baffles 30 coupled to the rod 22 and that rotate together with the rod 22. The rotating assembly 20 may include any number of baffles 30, depending on the overall length and/or volume of the interior space 18 of the processing device 12. Each individual baffle 30 may be integrally formed with the rod 22 or may be adhered to (e.g., heat bonded to) the rod 22. Whether the baffles 30 are integrally formed with or adhered to the rod 22, this relationship may be referred to herein as a coupling (e.g., the baffles 30 are coupled to the rod 22). The components of the device 12, the rod 22, and the baffles 30 may be formed from the same or different materials. In one embodiment, the rod 22 and the baffles 30 are formed from resilient and heat-resistant material, such as a metal. Suitable materials may include aluminum, steel, stainless steel, brass, copper, or plated base metals (i.e.

plated with precious and semi-precious plated metals like silver, gold, platinum group metals or other relatively inert metals, like chrome, nickel, etc.) In addition, materials like plastics, fluoroplastics, fiber-glass or carbon-fiber composites, or any material(s) compatible with the process and structurally suitable for rods or structural members may be employed in the construction of the device 12. The individual baffle 30 may extend outwardly (e.g., radially) from the rod 22 towards the surface 16 of the internal wall 14 to form an annulus or partial annulus about the rod 22 that includes a top surface 32 upon which liquid may pool and subsequently vaporize during separation of one or more volatile components. In another embodiment, the baffle 30 may extend orthogonally from the axis of rotation 26 or nonorthogonally, such as at an angle 40 (e.g., 5-10 degrees, 5-15 degrees, 1-20 degrees) offset from an orthogonal plane.

Each individual baffle terminates at an edge 42, which is spaced apart or forms a gap 44 with the internal wall surface 16 such that there is clearance during baffle rotation, i.e., such that the edges 42 of the baffles 30 do not directly contact the internal wall surface 16 during rotation of the rotating assembly 20. Depending on the configuration of each baffle, the gap 44 may be a constant distance, e.g., in embodiments when the baffle 30 is a ring. In other embodiments, the gap 44 may change in size about the circumference of the internal wall surface 16 when the baffle 30 features an edge 42 or edges 42 with an irregular curve or shape. Accordingly, in certain embodiments, each baffle 30 may be configured such that the gap 44 is at least a certain size (i.e., such that the edge 42 is at least a certain distance from the internal wall surface 16) at any given position along the edge 42 to provide a desired tolerance. In one embodiment, the baffles 30 may include different-sized and/or shaped baffles. For example, if the cross-sectional diameter of the interior space 18 varies along the axis of the rod 22, the span (edge-to-edge dimension) of each baffle 30 may change to accommodate a changed diameter of the internal surface (e.g. the external surface of the rotating internal rod may not be parallel with internal surface of the fixed inner wall).

The rotating assembly 20 may also include one or more disrupters 48 configured to rotate in concert with the baffles and/or rod 22. In operation, the liquid film disrupters 48 contact liquid film flowing on the internal wall surface 16 and, while rotating to contact the liquid film, generate droplets or spray that move towards the interior space 18 to promote increased liquid-vapor interaction. In the depicted embodiment, each disrupter 48 is coupled to the edges 42 of a subset of the baffles 30 to encompass the distance of the gap 44. However, other arrangements are also contemplated as provided herein. In one embodiment, the liquid film disrupter 48 extends a distance from the edge 42 about equal to or slightly greater than the distance of the gap 44 (e.g., 99-101% of the gap distance) to permit efficient rotation of the rotating assembly 20 even in the context of resistance or friction from contact of the liquid film disrupter 48 with the internal wall surface 16. In one embodiment, the liquid film disrupter 48 is formed from a conformable material to permit deflection or slight compression during rotation. The liquid film disrupter 48 may be configured as one or more of a scraper, wiper, comb, brush, or roller. As depicted, a plurality of liquid film disrupters 48 may be distributed circumferentially about the baffles 30 and/or about the length of the rod 22 to contact liquid film at various locations within the device 12.

The processing device 12 is coupled to one or more feed inlets 52. In one embodiment, an operator may select a desired feed inlet 52 at a bottom, (feed inlet 52a) mid (feed inlet 52b), or upper (feed inlet 52c) portion of the device 12. Each feed inlet 52 may be associated with different temperature exposure profiles and, therefore, the selection may be based on the volatile compound to be recovered. Further, in one embodiment, each portion of the device 12 may be heated by separate heat jackets or heating elements that are capable of being independently controlled. In one embodiment, the heat jacket or heat jackets are heated via a heat transfer fluid.

The overhead 54 of the processing device 12 may be fluidically coupled via a coupling 56 to a condenser 60 such that gas that collects in the overhead 54 is eventually cooled and collected in a reservoir 62. During distillation, a component of interest that is more volatile than other components of a liquid is enriched in the overhead collections. The system 10 also permits reflux return of condensed liquid enriched in the volatile compound of interest to the device 12 for additional cycles of distillation, which may improve separation. In certain embodiments, the volatile compound may be an undesired compound, and the distillation is performed to remove the undesired compound. Accordingly, the system 10 permits collection of the less or non-volatile components from the device 12.

Figure 2:
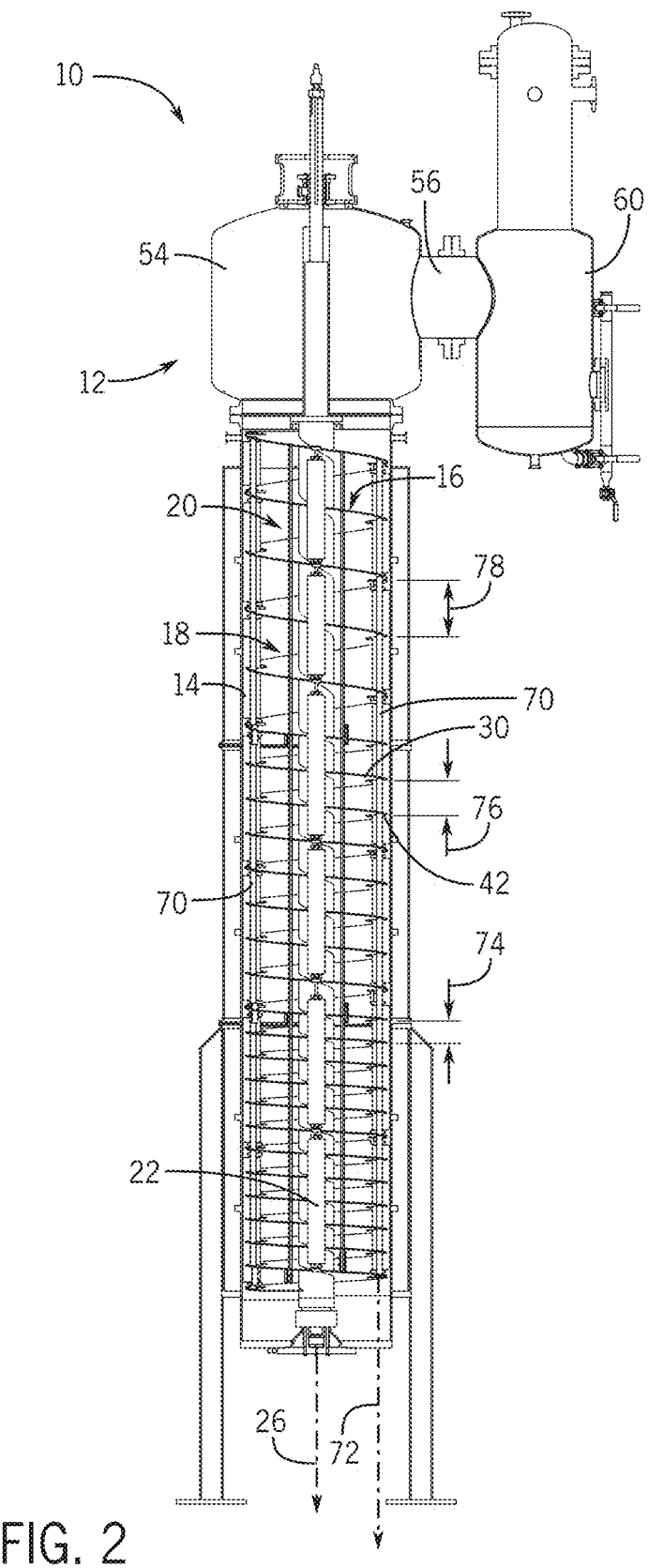
FIG. 2 is a partial cutaway view of an embodiment of a processing device in accordance with the present techniques.

FIG. 2 is a partial cutaway view of an embodiment of the processing device 12 in which the liquid film disrupter 48 is configured as a wiper 70 that is coupled to respective edges 42 and that is aligned along a vertical axis 72 substantially parallel to the axis of rotation 26 of the rod 22. The rotating assembly 20 may include one or more wipers 70 circumferentially distributed about the edges 42 of the baffles 30. The baffles 30 may be configured with notches or grooves that are sized and shaped to accommodate the wiper 70.

The depicted embodiment also includes a helical baffle configuration or auger configuration in which the baffles 30 are arranged with a variable flight spacing and pitch. Accordingly, in certain embodiments, the baffles 30 as disclosed herein, helical or nonhelical, may be arranged such that a pitch distance between two adjacent baffles is not the same as a pitch distances between at least one other set of adjacent baffles 30 of the rotating assembly 20. Because the vapor load will increase going up the device 12 while in operation, different flight spacing may be used to maintain a pressure drop of <10 mmHg across the device. For example, a stepped difference in spacing may be used in which a first subset of baffles 30 towards a bottom of the device 12 have a first pitch distance 74 that is smaller than the respective pitch distances of a second subset of baffles 30 (having a second pitch distance 76) in a midsection and/or a third subset of baffles 30 (having a third pitch distance 78) in an upper section, i.e., closer to the overhead space 54. In one embodiment, the appropriate spacing was determined to be approximately 4 inches in the lower section, 6 inches in the middle, and 10 inches in the top section. In another embodiment, the pitch distance may continuously vary up the device 12 towards the overhead space 54 such that a pitch distance 74 starting from a bottom-most set of baffles 30 is smallest and increases along the axis 26 of the rotating rod 22. The pitch distance may be measured edge-to-edge (e.g., edge 42) along an axis (e.g., axis 72) or as distance between coupling points to the rotating rod 22 for adjacent baffles 30.

Figure 3:
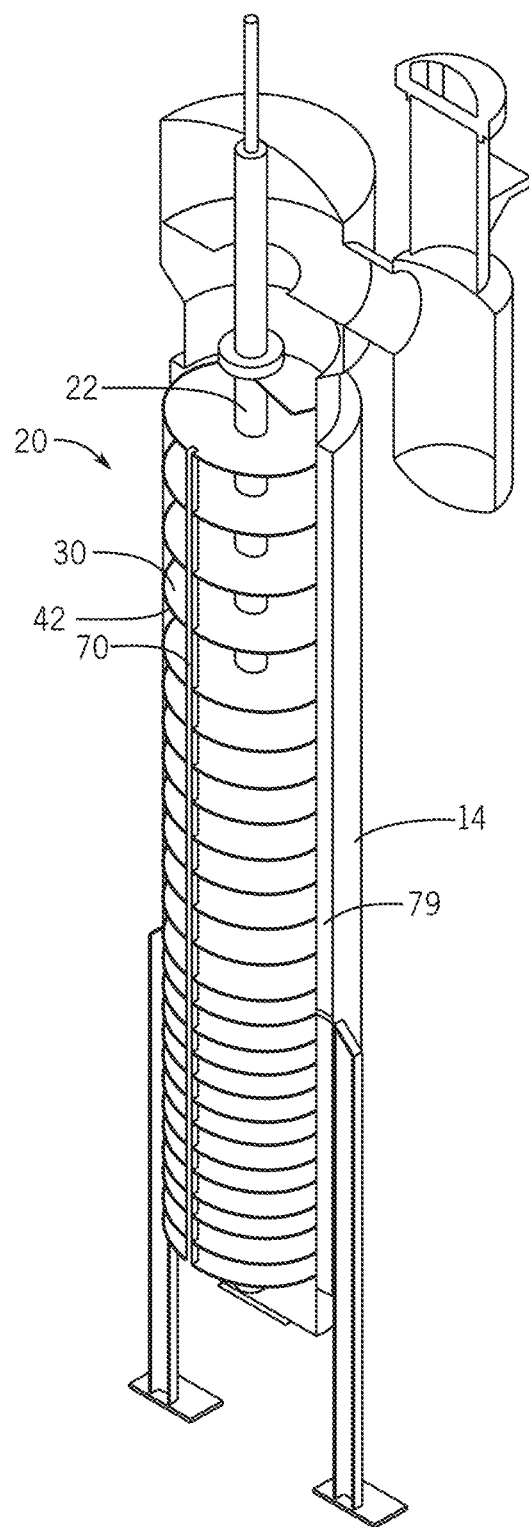
FIG. 3 is a partial cutaway view of an embodiment of a processing device in accordance with the present techniques.

FIG. 3 is a partial cutaway view showing an arrangement of an exterior device wall 79 forming a gap relative to the internal wall 14 to permit jacketing of the device 12 and heating via a heat transfer fluid. As disclosed herein, the heat jacket may be one or more heat jackets. The wiper 70 may include surface features (e.g., formed on or in an exterior surface) such as a vertical groove that may enhance droplet or spray formation while the wiper 70 is in operation. In certain embodiments, the groove may be continuous along the length of the wiper 70 or may be discontinuous. Further, the surface of the wiper 70 may include other surface features, such as one or more ridges or ribs.

Figure 4:
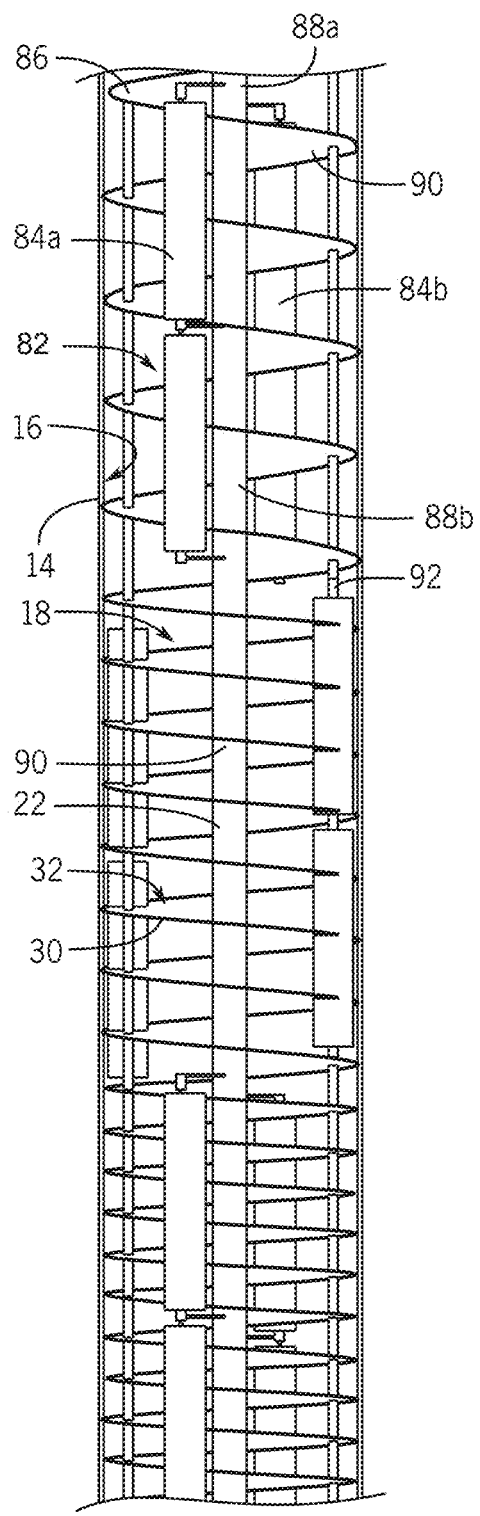
FIG. 4 is a partial cutaway view of an embodiment of a processing device in accordance with the present techniques.

FIG. 4 is a schematic view of an embodiment of the device 12 including a roller assembly 82. The device 12 in the depicted embodiment includes a plurality of roller assemblies 82. However, it should be understood the device 12 may include one, two, or any suitable number of roller assemblies 82. The roller assemblies 82 include one or more rollers 84 coupled to the rod 22 via a bracket 86 at an upper coupling point 88a and a lower coupling point 88b. The roller assembly 82 may be arranged to include a first roller 84a that is rotationally offset from a second roller 84b, e.g., offset about 180 degrees, 90 degrees at a given time such that the rollers 84 are distributed about the internal wall surface 16 at different time points to provide additional contact events during rotation of the rotating assembly 20. The device 12 may also include additional roller assemblies 82 along the length of the rotating rod 22 that, in turn, include one or more rollers 84 that are rotationally offset from the rollers 84 of an adjacent roller assembly 82.

When the roller assembly 82 is used in conjunction with a helical baffle arrangement, the coupling point or points 88 may be positioned on the rotating hollow rod 22 at breaks 90 or along an axis formed by the breaks 90 in the baffles 30. These breaks 90 represent circumferential locations about the rotating rod 22 at which extension of the baffle 30 towards the internal wall surface 16 is at a minimum (i.e., locations where the gap 44 with the edge 42, see FIG. 1, is largest). Accordingly, these locations may accommodate larger roller assemblies 82. Further, relative to embodiments in which relatively thinner or narrower scrapers or wipers are used, the rotating rod 22 used in conjunction with a roller assembly 82 may have a larger shaft diameter to prevent deflection during operation. The rotating hollow rod may extend into a bottom bearing that further stabilizes the rotating assembly. The rotating assembly 20 (see FIG. 2) may also include one or more stabilizing ribs 92 to facilitate even rotation and prevent deflection or harmonic vibrations of the baffles 30.

During rotation of the rotating assembly 20, the rollers 84 contact the internal wall surface 16 and, as a result of the contact under the rotational force of the rotating assembly 20, the rollers 84 rotate relative to their brackets 86. The rotating assembly 20 rotates the rod 22 under motor control, and the rollers 84 rotate through, at least in part, contact with the wall 16 while moving about the circumference of the internal wall in conjunction with the rotating assembly 20. The rollers 84 may be implemented without separate motors to drive their rotation.

Figure 5:
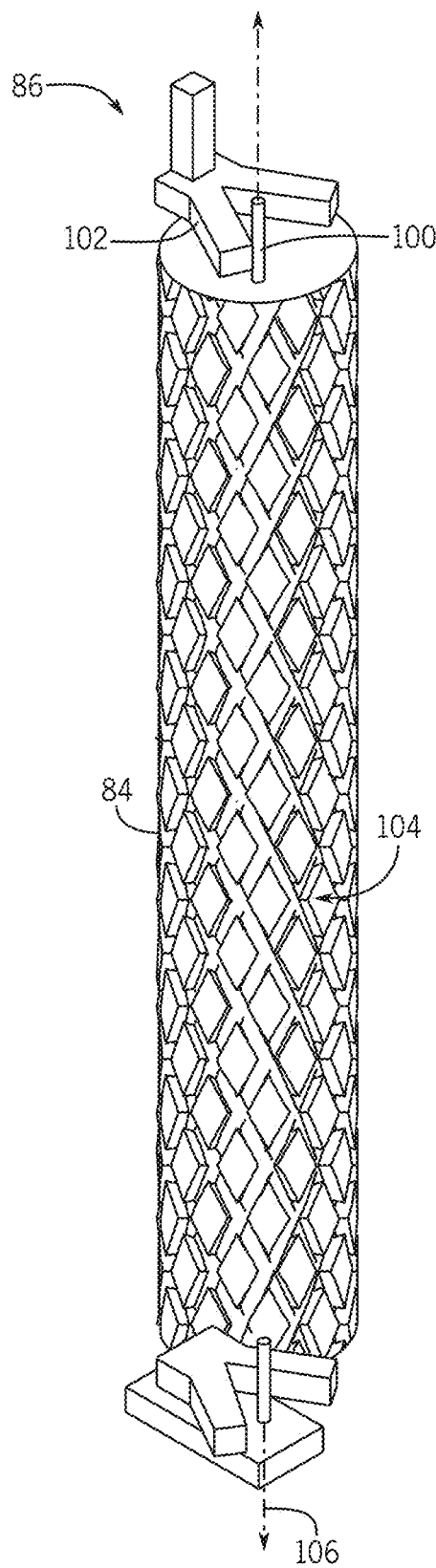
FIG. 5 is a perspective view of an embodiment of a roller in accordance with the present techniques.

FIG. 5 is a perspective view of an example roller 84 coupled to the bracket 86 via a fork design, which permits movement of the roller relative to the bracket 86 and towards the internal wall surface 16 to push the roller 84 forward. The roller 84 is coupled to the bracket 86 via a pin 100 that fits within a gap formed in a fork 102. The gap is open towards the internal wall surface 16. Centripetal forces of rotation of the rotating assembly 20 help the roller 84 maintain contact with the internal wall surface 16 (FIG. 1). During rotation, the pin 100 may move within the fork to facilitate adjustments of the position of the roller surface towards the internal wall surface 16. The roller 84 rotates about an axis of rotation 106 that is parallel or substantially parallel to the axis of rotation 26 of the rotating rod 22 (FIG. 1).

An advantage of the roller 84 is the increased vapor-liquid contact caused by the larger liquid film surface area of the roller and roller spray/droplets of the liquid film flowing on the internal wall surface 16. The roller 84 may greatly increase surface area by picking liquid up off the walls and throwing it into the middle of the device in small droplets. In one embodiment, the liquid surface area of film contact may increase by over 500% from the small droplets. The increase in surface area is related to droplet size. Grooved or textured rollers 84 may be employed to control the spray/droplet size and quantity and to convey the liquid film in a preferred direction, i.e., upward, downward, and axially, depending on the feed composition, evaporation rate, rotational speed of the internal components and the pitch and spacing of an internal vapor baffle. Accordingly, a roller surface may feature a pattern of ridges and/or protrusions. The roller 84 may also feature a high grip tread design on the roller surface 104 to prevent the roller 84 from slipping on the wall.

In certain disclosed embodiments, the processing device 12 may be provided as part of a larger separation processes. In one embodiment, the processing device 12 may be separable and/or swappable to permit selection of an appropriately configured device 12 according to the desired separation parameters or for repair or maintenance. In one embodiment, individual elements of the processing device 12 may be replaced or exchanged. For example, a first rotating assembly 20 including wipers 70 may be removed from the processing device 12 and replaced with a second rotating assembly 20 including rollers 84 to improve a separation process. In another embodiment, the disrupters 48 may wear more quickly than other components of the rotating assembly 20. Accordingly, in one embodiment, the rotating assembly 20 may be configured to permit swapping of a used disrupter 48 (e.g., a wiper 70 or roller 84) with a new disrupter 48. For example, the pin 100 and roller 84 may be easily removed via the fork 102 from the bracket 86 and replaced when the roller surface 104 is worn or fouled.

Figure 6:
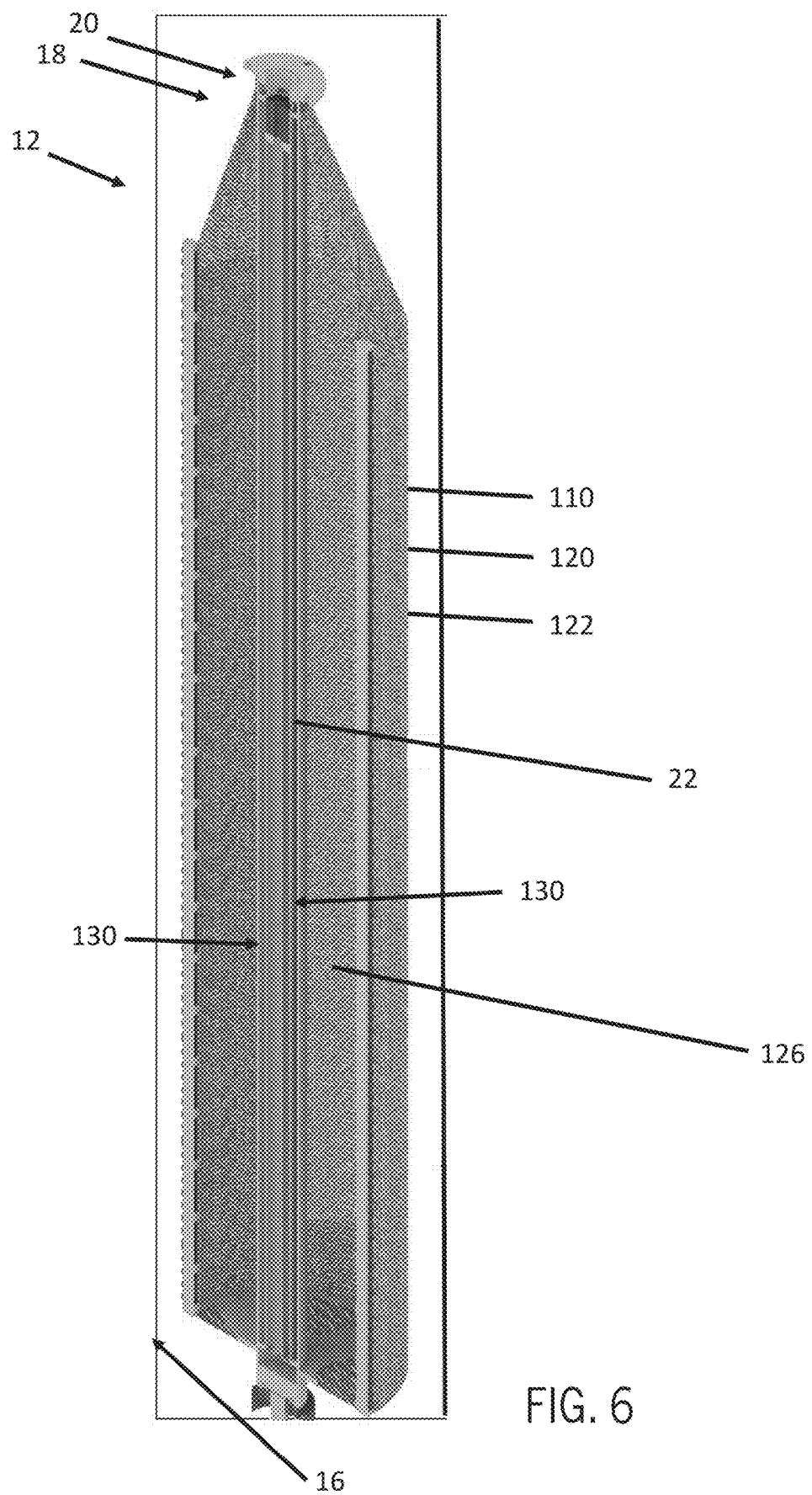
FIG. 6 is a partial cutaway view of an embodiment of a perforated basket with packing in accordance with the present techniques.

FIG. 6 is an embodiment of the rod 22 of the rotating assembly 20 in which the rod 22 is surrounded by a basket 110 that is formed from a perforated surface 120 that includes a plurality of apertures 122. The apertures 122 of the perforated surface 120 rotate within the interior space 18 and with respect to the interior surface 16 together with rotation of the rod 22. In certain embodiment, the perforated surface 120 is spaced apart from the interior surface 16 to form a gap. The basket interior 126 may be at least partially filled with loose or structured packing that is contained by the perforated surface 120. The packing components may include large and/or small pieces which are formed from pure metals, alloys, ceramics, carbon, or plastics. The internal packing may also contain a catalyst or catalytic compounds loaded upon an inert support. Further, the basket interior 126 of the rotating assembly 22 also may also contain internal components constructed from woven wire, carbon or other fibers, e.g., materials used in structured column packing to promote gas/liquid interactions and mass transfer. The basket interior 126 may function to promote processing of a material within the processing device 12 during rotation of the rotating assembly 20. The rod 22 that supports and drives the rotation of the entire basket 110 may also be employed as a heat exchanger. That is, as shown, the rod 22 may also include one or more internal passages 130 that may receive a heat transfer fluid. The illustrated embodiment may be used with or without the baffles 30 depicted in other embodiments. One or more baffles 30 may or may not extend from the rod 22.

Figure 7:
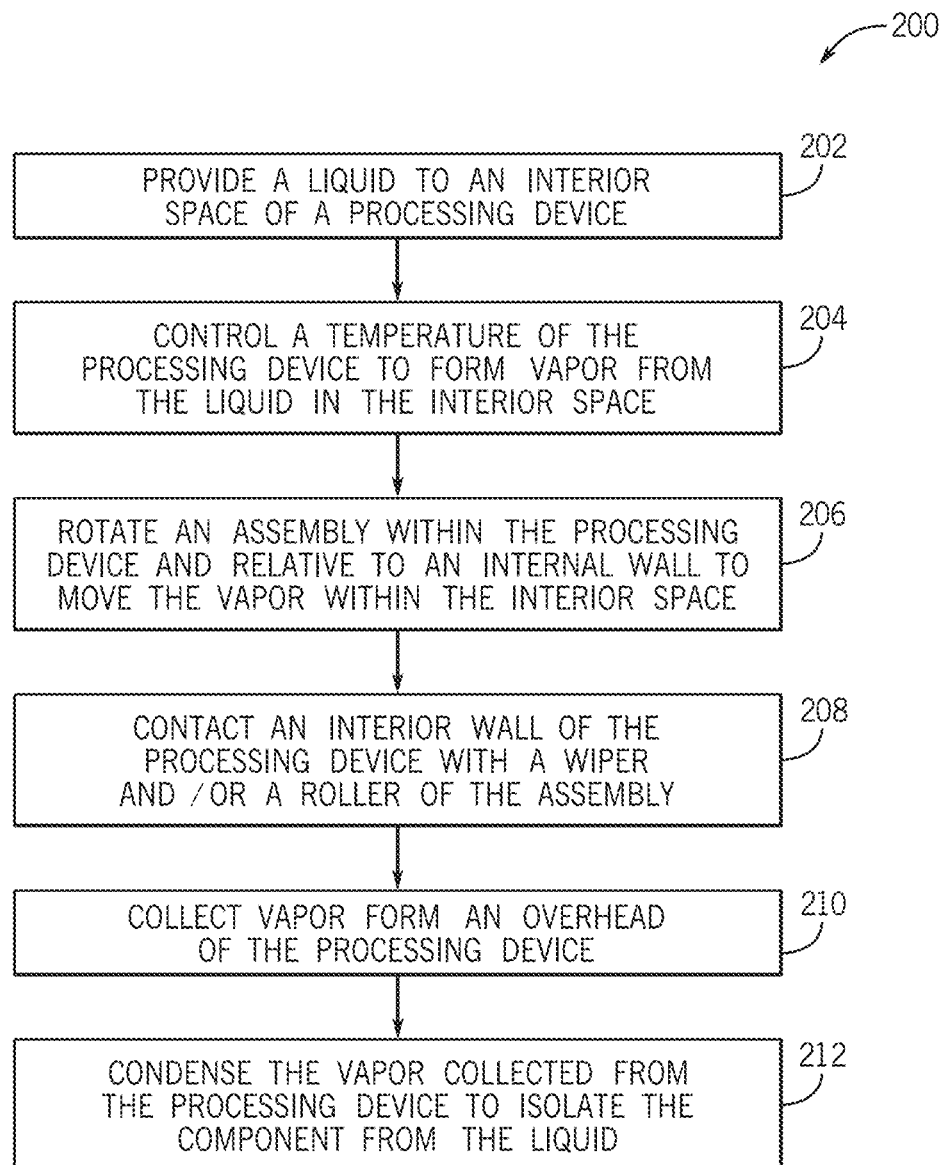
FIG. 7 is a flow diagram of operation of a processing device, in accordance with present techniques.

FIG. 7 is a flow diagram of a method 200 of operating a processing device 12 as part of a separation process as provided herein. The method begins with providing a liquid to an interior space of a processing device 12 (block 202), such as via a feed inlet 52. The processing device 12 is heated, e.g., via a heat jacket, to facilitate formation of vapor from the liquid (block 204). A rotating assembly is driven to rotate with an interior space of the processing device 12 (block 206), which in turn causes the vapor to move within the interior space. Rotation of the rotating assembly also causes a disrupter 48, e.g., a wiper 70 or a roller 84, to contact an internal wall 14 of the processing device 12 (block 208). Vapor that rises to the top of the device in the overhead 54 is collected (block 210) and transferred to a condenser to be cooled (block 212). The collected and cooled resultant liquid is enriched in lower boiling components relative to the feed liquid.

While only certain features of the disclosure have been illustrated and described herein, many modifications and changes will occur to those skilled in the art. It is, therefore, to be understood that the appended claims are intended to cover all such modifications and changes as fall within the true spirit of the disclosed embodiments.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A processing device, comprising:
    an internal wall of a jacket;
    a rotating rod positioned within an interior space formed by the internal wall;
    a plurality of baffles spaced apart from one another along the rotating rod and extending away from the rotating rod towards the internal wall, wherein the plurality of baffles are configured to rotate with the rotating rod relative to the internal wall; and
    at least one wiper coupled to an edge of at least one of the plurality of baffles or coupled to the rotating rod, wherein the at least one wiper is configured to contact the internal wall, and wherein the at least one wiper is configured to rotate with the rotating rod, wherein rotating the rotating rod causes the at least one wiper to contact a film of liquid on the internal wall such that rotation of the at least one wiper against the internal wall causes droplets of the liquid to move towards a center of the interior space.

2. The processing device of claim 1, wherein the plurality of baffles forms a helix.

3. The processing device of claim 1, wherein a first subset of the plurality of baffles are spaced apart from one another with a first spacing along the rotating rod and wherein a second subset of the plurality of baffles are spaced apart from one another with a second spacing along the rotating rod, wherein the first spacing is greater than the second spacing.

4. The processing device of claim 3, comprising a fluid coupling to an external condenser, and wherein the first subset is positioned along the rotating rod closer to the fluid coupling than the second subset.

5. The processing device of claim 4, comprising a third subset of the plurality of baffles spaced apart from one another a third pitch distance such that the plurality of baffles form three stages along the rotating rod.

6. The processing device of claim 1, wherein individual baffles of the plurality of baffles are spaced apart from one another along the rotating rod at a varying pitch distance.

7. The processing device of claim 6, wherein the varying pitch distance continuously increases towards a fluid coupling of the processing device with an external condenser.

8. The processing device of claim 1, wherein at least one baffle of the plurality of baffles extends nonorthogonally from an axis of rotation of the rotating rod.

9. The processing device of claim 1, wherein the plurality of baffles do not directly contact the internal wall such that a gap is formed between individual edge portions of the plurality of baffles and the internal wall.

10. The processing device of claim 1, wherein the rotating rod is hollow and comprises an interior passage configured to receive a heat exchange fluid.

11. The processing device of claim 1, wherein the jacket is continuous, dimpled, or half-pipe and is configured to receive a heat exchange fluid.

12. The processing device of claim 1, comprising an inlet that receives a material to be processed and an outlet to permit outflow from the processing device of at least one separated component from the material.

13. The processing device of claim 1, where a ratio of a surface area of the rotating rod to a surface area of the internal wall is between 1:20 to 0.9:1.

14. The processing device of claim 1, where the plurality of baffles comprise respective notches that accommodate the at least one wiper along a vertical axis.

15. The processing device of claim 1, where the at least one wiper comprises a groove.

16. The processing device of claim 15, where the groove is discontinuous.

17. The processing device of claim 1, where the at least one wiper comprises one or more ridges or ribs.

18. A method, comprising:
    providing a liquid having an initial percentage composition of a component to an interior space of a processing device;
    controlling a temperature of a jacket of the processing device to form vapor from the liquid in the interior space, wherein the vapor comprises a different mixture of the component;
    rotating a rotating assembly within the processing device and relative to the jacket to move the vapor within the interior space, wherein rotating the rotating assembly causes a plurality of wipers coupled to a rod of the rotating assembly to contact a film of the liquid on an interior wall of the jacket such that rotation of the plurality of wipers against the interior wall causes droplets of the liquid to move towards a center of the interior space; and
    condensing the vapor collected from the processing device to form a condensate to remove the component from the processing device, wherein the condensate has a second percentage composition of the component that is higher than the initial percentage composition of the component in the liquid.

19. The method of claim 18, wherein controlling the temperature of the jacket comprises heating at least one of a plurality of sections of the jacket that are individually controlled.

* * * * *